July 21, 1970          C. W. POOLE          3,521,230

LOW TIRE PRESSURE SENSING MECHANISM

Filed Nov. 7, 1967          2 Sheets-Sheet 1

CHARLES W. POOLE
INVENTOR

BY John R. Faulkner
Keith L. Gerschling
ATTORNEYS

United States Patent Office 3,521,230
Patented July 21, 1970

3,521,230
LOW TIRE PRESSURE SENSING MECHANISM
Charles W. Poole, Livonia, Mich., assignor to Ford Motor
Company, Dearborn, Mich., a corporation of Delaware
Filed Nov. 7, 1967, Ser. No. 681,160
Int. Cl. B60q 1/00
U.S. Cl. 340—58                                    10 Claims

ABSTRACT OF THE DISCLOSURE

A low tire pressure sensing or transducing mechanism in which a permanent magnet is variably positioned by the air pressure in the tire. When the air pressure in the tire is at its normal level, the permanent magnet is biased by the air pressure in the tire to a position where its magnetic field has insufficient force to close a normally open electromagnetically operated switch. When the air pressure in the tire falls to a predetermined or dangerously low level, means are provided to move the permanent magnet against the force provided by the low air pressure into a position where the normally open electromagnetically operated switch is subjected to a magnetic field of sufficient intensity to close the switch. Closure of the electromagnetically operated switch will cause a circuit to close which may in turn operate a warning device, for example, a warning lamp that will warn the operator of the vehicle that a low pressure condition exists in the tire. The low tire pressure sensing mechanism of the present invention preferably comprises an annular housing located in an aperture in the wheel rim on which the tire is mounted. The end of the housing located within the tire is closed by an annular keeper having a central aperture positioned therethrough so that the air pressure in the tire may apply a force to an annular magnet positioned around the keeper to bias it inwardly toward the tire rim and around the keeper against the bias of an annular spring. When the magnet is in this position, the keeper shunts the flux of the magnet. When the air pressure in the tire falls to a predetermined low level the magnet will move outwardly on the keeper so that its magnetic flux or field moves closer to the electromagnetically operated switch and is only partially shunted by the keeper. In this position the flux or magnetic field has sufficient force to close the electromagnetically operated switch.

BACKGROUND OF THE INVENTION

There have been numerous proposed devices in the prior art for providing a vehicle operator with some type of warning signal when the air pressure in a vehicle tire falls to a dangerously low level. Many of these devices employ complicated and expensive mechanisms for shifting a permanent magnet into close proximity to an electromagnetically operated switch when this occurs. Shifting of the permanent magnet and the subsequent operation of the switch causes the closure of an electrical circuit to provide a warning for the vehicle operator.

As stated above, many of these prior art devices are complex in nature, expensive to manufacture, require an inordinate amount of maintenance and may leave considerable to be desired in the way of reliability. The present invention, as will be explained more fully subsequently, eliminates most of these undesirable features and provides a mechanism that is reliable, inexpensive, uncomplicated and requires little, if any, maintenance.

SUMMARY OF THE INVENTION

In accordance with the present invention, there is provided a low tire air pressure transducing means and system that will provide the vehicle operator with a warning signal when the air pressure in a vehicle tire falls to a predetermined or dangerously low level.

The transducer of the present invention comprises a housing, preferably, cylindrical in configuration and composed of a non-ferro-magnetic material, that extends through an aperture in the rim of the vehicle wheel upon which the tire is mounted. Means are provided for sealing this cylindrical housing to the rim of the vehicle wheel. A ferro-magnetic core closes one end of the cylindrical housing and extends into it in a generally concentric relationship, and this core has a central bore extending therethrough that provides communication from the tire to the other end of the cylindrical housing which is closed by an annular wall of non-ferro-magnetic material.

An annular permanent magnet is positioned around the core and in sliding sealing arrangement with both the core and the inner wall of the housing. Spring means operatively engage both the annular permanent magnet and the ferro-magnetic core for biasing the annular permanent magnet outwardly away from the rim and the tire. When the air pressure in the tire is at normal levels, the air pressure in the tire, that is communicated to the outer side of the annular permanent magnet through the aperture in the ferro-magnetic core or keeper is sufficient to keep the annular permanent magnet positioned around the keeper against the bias of the spring means so that the flux from the magnet is shunted by the keeper.

When the air pressure in the tire falls to a predetermined low level, the force of the air pressure exerted against the permanent magnet on the side opposite the spring means is lowered to a level where the spring means moves the permanent magnet outwardly from the rim and the tire and into engagement with the closed end of the non-ferro-magnetic housing. The end of the ferro-magnetic keeper is spaced from the end of this housing so that the flux from the permanent magnet is no longer shunted by the keeper.

An electromagnetically operated switch, preferably in the form of a reed switch, is positioned in close proximity to the closed end of the non-ferro-magnetic housing. When the air pressure in the tire is at proper operating levels and the annular permanent magnet is positioned around the keeper, the flux from the permanent magnet is insufficient to operate the reed switch, but when the air pressure in the tire falls to the above mentioned predetermined low level and the permanent magnet moves outwardly against the end of the non-ferro-magnetic housing and away from the keeper, the flux of the permanent magnet is sufficient to close the electromagnetically operated switch.

The electromagnetically operated switch is connected in circuit with a warning device positioned in the vehicle. As a result, when the electromagnetically operated switch closes, the vehicle operator is warned that the air pressure in the tire has fallen to a dangerously low level. He may then stop the vehicle and either add air to the tire or change it to avoid a potentially dangerous situation.

In the preferred embodiment of the invention, the reed switch is mounted in a fixed position in the vehicle and as the rim and tire of the vehicle rotate, the transducer described above periodically passes the electromagnetically operated or reed switch and, therefore, closes and opens this switch on a periodic basis. This occurs, of course, only when the air pressure in the tire is at the predetermined or dangerously low level where the annular permanent magnet is in a position to operate the switch.

BRIEF DECRIPTION OF THE DRAWINGS

DESCRIPTION OF THE PREFERRED EMBODIMENT

Figure 1:
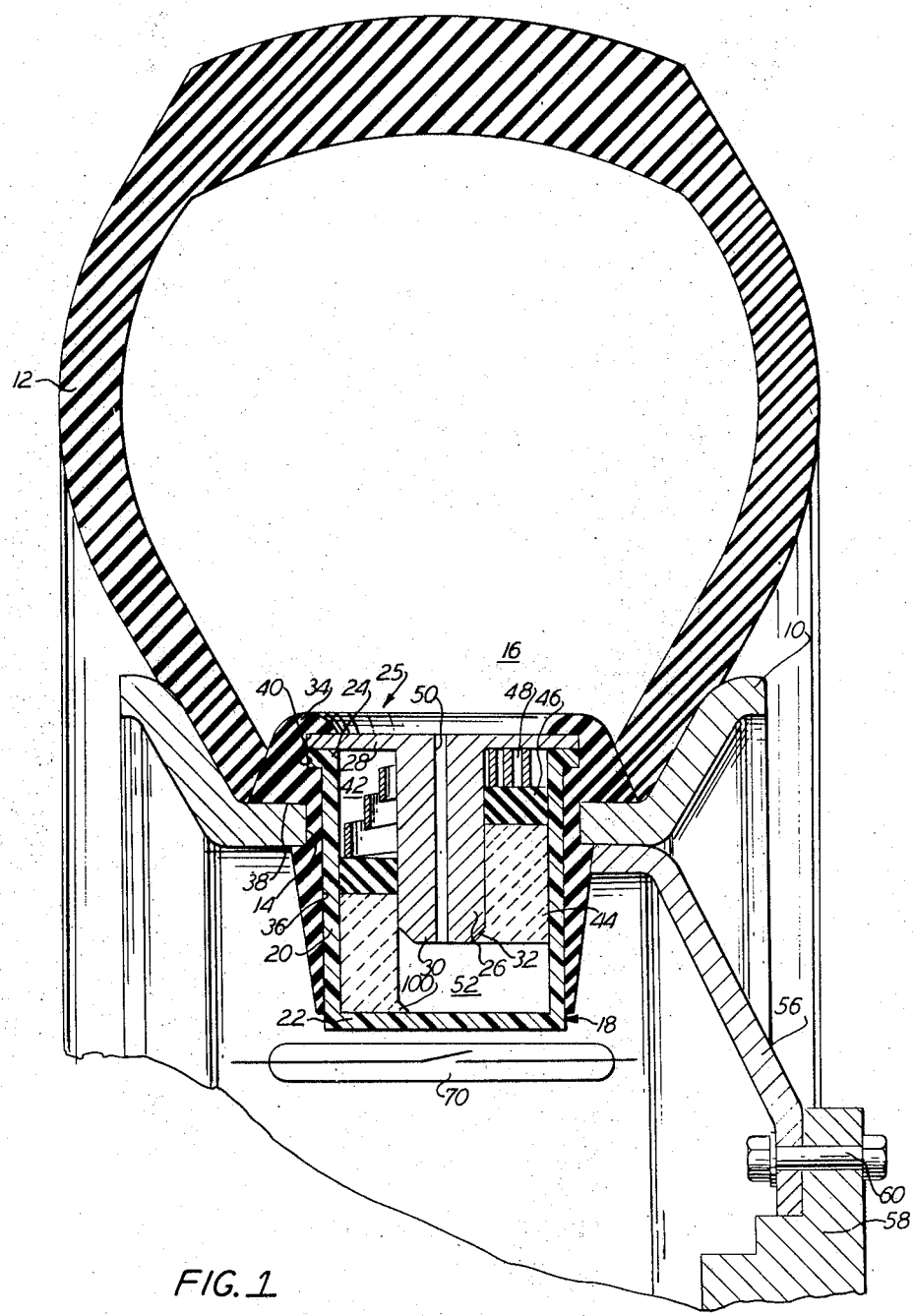
FIG. 1 is a cross sectional view through the transducer or sensing mechanism of the present invention, with the left half showing the position of the permanent magnet when the air pressure in the tire is at a predetermined low level and the right half showing the position of the permanent magnet when the pressure in the tire is at a normal operating level.

Referring now to the drawings in which like reference numerals designate like parts throughout the several views thereof, there is shown in FIG. 1 a wheel rim 10 having a tire 12 mounted thereon. The wheel rim 10 has an aperture 14 positioned therein for the reception of the transducer or sensing mechanism 16 of the present invention. It should be realized that the transducer or sensing mechanism 16 may be much smaller than the dimensions shown in FIG. 1, but for the purpose of clarity it has been shown on this scale.

The transducer 16 of the present invention comprises a housing 18 constructed preferably of a non-ferro-magnetic material and having a cylindrical side wall 20 and an end wall 22 that closes the housing at the end of the housing remote from the tire 12. The housing 18 also has an outwardly extending annular flange 24 positioned interiorly of the tire 12.

A keeper 25, constructed of a ferro-magnetic material, preferably soft iron, has a main body portion 26 of smaller diameter than the inner diameter of the cylindrical side wall 20 of the housing 18 and an annular flange 28 extending radially outwardly from the main body portion 26. The main body portion 26 fits into the housing 18 preferably in concentric relationship with respect to the cylindrical side wall 20 of the housing 18 and the annular flange 28 fits over the annular flange 24 on the housing 18. As can be readily seen by reference to the drawing, the end 30 of the main body portion 26 of the keeper 25 is spaced from the end wall 22 of the cylindrical housing 18 and this end has a chamfered portion 32 for purposes that will be described subsequently.

The transducer 16 is positioned in sealing engagement with the tire rim 10 and in the aperture 14 by means of an elastomeric seal 34 which has an inner diameter 36 that sealingly engages the outer diameter of the cylindrical wall 20 of the housing 18.. The seal 34 also has an annular undercut portion 38 on the outer diameter thereof that receives the tire rim 10 in sealing engagement and another annular undercut portion 40 that sealingly engages the annular flange 24 on the housing 18 and a portion of the annular flange 28 positioned on the keeper 25.

As can be appreciated by an inspection of the drawings, an annular space 42 is provided between the outer diameter of the main body portion 26 of the keeper 25 and the inner diameter of the cylindrical wall 20 of the housing 18. An annular permanent magnet 44 which is axially polarized, an annular seal 46 and an annular helical spring 48 are positioned within the annular space 42. The annular spring 48 is positioned in engagement with the flange 28 of the keeper 25 and in engagement with the seal 46, while the seal 46 engages the annular permanent magnet 44. It should be noted also from an inspection of FIG. 1 of the drawing that the keeper has a central bore 50 that communicates with the interior of the tire 12 and with a chamber 52 provided between the end of the main body portion 26 of the keeper and the end wall 22 of the housing 18.

As is conventional in this type of structure, the wheel rim 10 is supported on a wheel 56 that is attached to a hub 58 by means of bolts, one of which is shown at 60. Since this structure is conventional, a further description of it is considered unnecessary.

Figure 2:
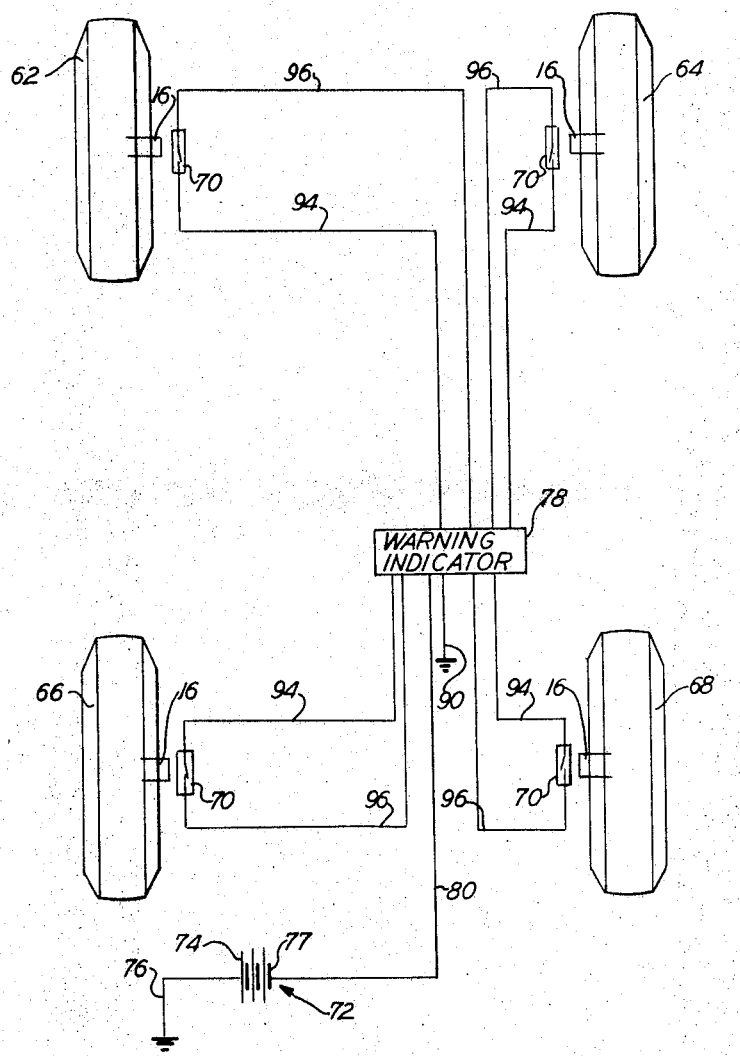
FIG. 2 is a circuit diagram of the electrical warning circuit of the present invention.

In FIG. 2 of the drawing, there is shown a circuit diagram of the warning system of the present invention in which a transducer 16 is positioned in the rim 10 of each of the wheels 62, 64, 66 and 68 of an automotive vehicle.

Each transducer is positioned closely adjacent a normally open electromagnetically operated switch 70 that may be mounted in a stationary position in the motor vehicle. This electromagnetically operated switch is also shown in FIG. 1 and may take the form of a conventional normally open reed switch.

As shown in FIG. 2 a source of electrical energy 72, in the form of an electrical storage battery, has one terminal thereof, for example, terminal 74, the positive terminal, connected to ground by means of a lead 76. The other terminal 77 is connected to a conventional warning indicator 78 shown in block diagram form through a lead 80. This warning indicator which may be four electrical lamps or four electrical buzzers connected in parallel, may have two bus bars, one of which is connected to the negative terminal 77 of the battery 72 through the lead 80 and the other of which is connected to ground through a lead 90. Each of the electromagnetically operated switches 70 is connected in series with the two bus bars by leads 94 and 96 so that when the electromagnetically operated switches 70, preferably in the form of reed switches, are closed, a circuit will be completed through the warning indicator to indicate which of the tires has dangerously low air pressure.

In the operation of the transducer 16 shown in FIG. 1, the right-hand portion of the sectional view through the transducer 16 shows the position of the permanent magnet 44 when the air pressure in the tire 12 is at a normal level. The air pressure in the tire 12 is communicated to the chamber 52 through the bore 50 positioned in the keeper and the tension in the spring 48 is designed so that the permanent magnet 44 is in the position shown in the right-hand portion of that figure due to the force applied to the permanent magnet 44 by the air pressure in the chamber 52. When the permanent magnet 44 is so positioned, the main body portion 26 of the keeper 25 shunts the flux of the permanent magnet, and additionally, it is positioned remotely from the electromagnetically operated switch 70, which as stated before, may be in the form of a reed switch. In this position an inwardly extending chamfered annular flange 100 engages the chamfered portion 32 on the main body portion 26 of the keeper 25 to provide a stop for the annular permanent magnet 44.

If, however, the air pressure in the tire 12 falls to a predetermined low and dangerous level, the force exerted by the air pressure present in the chamber 52 is insufficient to prevent the spring 48 from forcing the permanent magnet 44 and the seal 46 into the position shown in the left portion of the view shown in FIG. 1. In that position, the flux from the permanent magnet 44 is sufficient to close the electromagnetically operated switch 70, preferably in the form of a reed switch, and to operate the warning indicator 78. As previously stated, the closing and opening of this switch will be periodic as the transducer 16 moves by the electromagnetically operated switch 70 once during each revolution of the wheels 62 through 68.

It should be realized that the transducer 16 of the present invention may be located at any position in the rim of the vehicle wheel where it may communicate with the air pressure in the interior of the tire. It has been shown in the particular location of FIG. 1 for illustrative purposes.

Thus, the present invention provides a very reliable, inexpensive and uncomplicated low tire pressure transducer and warning system.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. In a low pressure sensing means for a vehicle tire the combination comprising, a wheel rim, a tire under pressure mounted on said wheel rim, said wheel rim having an aperture positioned therein, a housing of non-ferro-magnetic material engaging said rim and extending through said aperture, sealing means engaging said rim and said housing for sealing said housing to said rim, an annular permanent magnet slidably mounted in said housing, a switch means operable by said magnet and carried by said vehicle, means engaging said permanent magnet and said housing for urging said permanent magnet toward said switch means, means passing through said permanent magnet and including means in communication with the interior of said tire for urging said permanent magnet away from said switch means by air under pressure from said tire and signal means operable by the closing of said switch means.

2. The combination of claim 1 in which said means passing through said permanent magnet comprises a ferro-magnetic core means for acting as a guide and a keeper for said permanent magnet.

3. The combination of claim 2 in which said ferro-magnetic core includes a main body portion of generally cylindrical configuration passing through said annular permanent magnet and having an axial bore extending therethrough.

4. The combination of claim 3 in which said ferro-magnetic core has a radially extending flange positioned within said tire and is positioned in sealing engagement with said sealing means and comprises a one end of said housing.

5. The combination of claim 4 in which said means engaging said permanent magnet for urging said permanent magnet toward said switch means comprises a spring having one end engaging said radially extending flange of said ferro-magnetic core and the other end operatively engaging one side of said annular permanent magnet.

6. The combination of claim 5 in which a slidable annular high pressure seal is positioned between said last mentioned end of said spring and said side of said annular permanent magnet and is positioned in sealing engagement with said main body portion of said ferro-magnetic core and said housing.

7. The combination of claim 4 in which said sealing means has a first annular groove for receiving said tire rim in sealing engagement and a second annular groove for receiving the radially extending flange of said ferro-magnetic core in sealing engagement.

8. The combination of claim 5 in which said housing constructed of a non-ferro-magnetic material has an end wall positioned opposite the annular flange of said ferro-magnetic core and said switch means is located adjacent said last mentioned end wall.

9. The combination of claim 1 in which said annular permanent magnet has a radially inwardly extending means and said main body portion of said ferro-magnetic core has complementary means engaging said radially inwardly extending means for limiting the movement of said annular permanent magnet toward said tire when the pressure in said tire is at its normal operating level or above.

10. A low air pressure transducing means for an automotive vehicle tire comprising a tire rim, an aperture positioned within said rim, a housing having a cylindrical side wall and an end wall both constructed of non-ferro-magnetic material, a centrally positioned core of ferro-magnetic material having a bore positioned therethrough and one end spaced from the end wall of said housing, a permanent magnet positioned within said housing and having an aperture positioned therein, said permanent magnet slidably engaging both said centrally positioned core and said housing, and means positioned in said housing and engaging one side of said permanent magnet for urging said permanent magnet toward said end wall against the air pressure in said tire positioned in the space between said one end of said core and the end wall of said housing.

References Cited

UNITED STATES PATENTS 2,057,556  10/1936  Cole _____ 340—58

ALVIN H. WARING, Primary Examiner

U.S. Cl. X.R.

200—61.25